United States Patent [19]

Lee, II

[11] 4,088,350

[45] May 9, 1978

[54] PLASTIC TUBING CONNECTOR

[75] Inventor: Leighton Lee, II, Guilford, Conn.

[73] Assignee: The Lee Company, Westbrook, Conn.

[21] Appl. No.: 658,074

[22] Filed: Feb. 13, 1976

Related U.S. Application Data

[63] Continuation of Ser. No. 485,789, Jul. 5, 1974.

[51] Int. Cl.² .............................................. F16L 21/06
[52] U.S. Cl. ..................................... 285/322; 285/331;
 285/334.1; 285/334.2; 285/356; 285/423
[58] Field of Search ...................... 285/322, 331, 334.1,
 285/334.2, 334.3, 356, 323, 246, 249, 353, 342,
 332, 238, 334.5, 423

[56] References Cited

U.S. PATENT DOCUMENTS

| 2,453,127 | 11/1948 | Guarnaschelli | 285/334.5 X |
| 3,225,435 | 12/1965 | Anthon | 285/238 X |

FOREIGN PATENT DOCUMENTS

| 1,068,423 | 2/1954 | France | 285/246 |
| 1,161,791 | 3/1958 | France | 285/353 |
| 368,365 | 2/1934 | Italy | 285/323 |

Primary Examiner—Dave W. Arola
Attorney, Agent, or Firm—Prutzman, Hayes, Kalb & Chilton

[57] ABSTRACT

A connector for Teflon tubing having a male connector with a tapered end providing a male conical sealing surface engageable with a conforming internal conical sealing surface machined in the end of the Teflon tubing. A collet having an annular collar conforming to and surrounding the interfitting male connector and end of tubing provides with the male conical sealing surface an axially extending wedge-shaped annulus for receiving and gripping the internally tapered end of the Teflon tubing.

7 Claims, 2 Drawing Figures

PLASTIC TUBING CONNECTOR

This is a continuation of application Ser. No. 485,789 filed July 5, 1974, and entitled "Fluid Valve And Valve System".

BRIEF DESCRIPTION OF THE INVENTION

The present invention relates to tubing connectors and more particularly to a new and improved tubing connector useful with soft and pliable tubing of Teflon or the like plastic.

It is a principal aim of the present invention to provide a new and improved plastic tubing connector for small diameter (e.g. ⅛ inch outside diameter) tubing of Teflon or the like plastic.

It is another aim of the present invention to provide a new and improved plastic tubing connector for connecting Teflon or the like plastic tubing to a body of a like plastic material.

It is a further aim of the present invention to provide a new and improved plastic tubing connector useful with highly corrosive fluids.

It is another aim of the present invention to provide a new and improved plastic tubing connector having an economical and reliable construction and providing a reliable fluid-tight connection for a long service-free useful life.

It is another aim of the present invention to provide a new and improved standard plastic tubing connector for standard size (e.g. ⅛ inch outside diameter) plastic tubing and which permits using such standard size tubing with any desired inside diameter.

Other objects will be in part obvious and in part pointed out more in detail hereinafter.

A better understanding of the invention will be obtained from the following detailed description and the accompanying drawing of illustrative applications of the invention.

DESCRIPTION OF THE PREFERRED EMBODIMENTS

Figure 1:
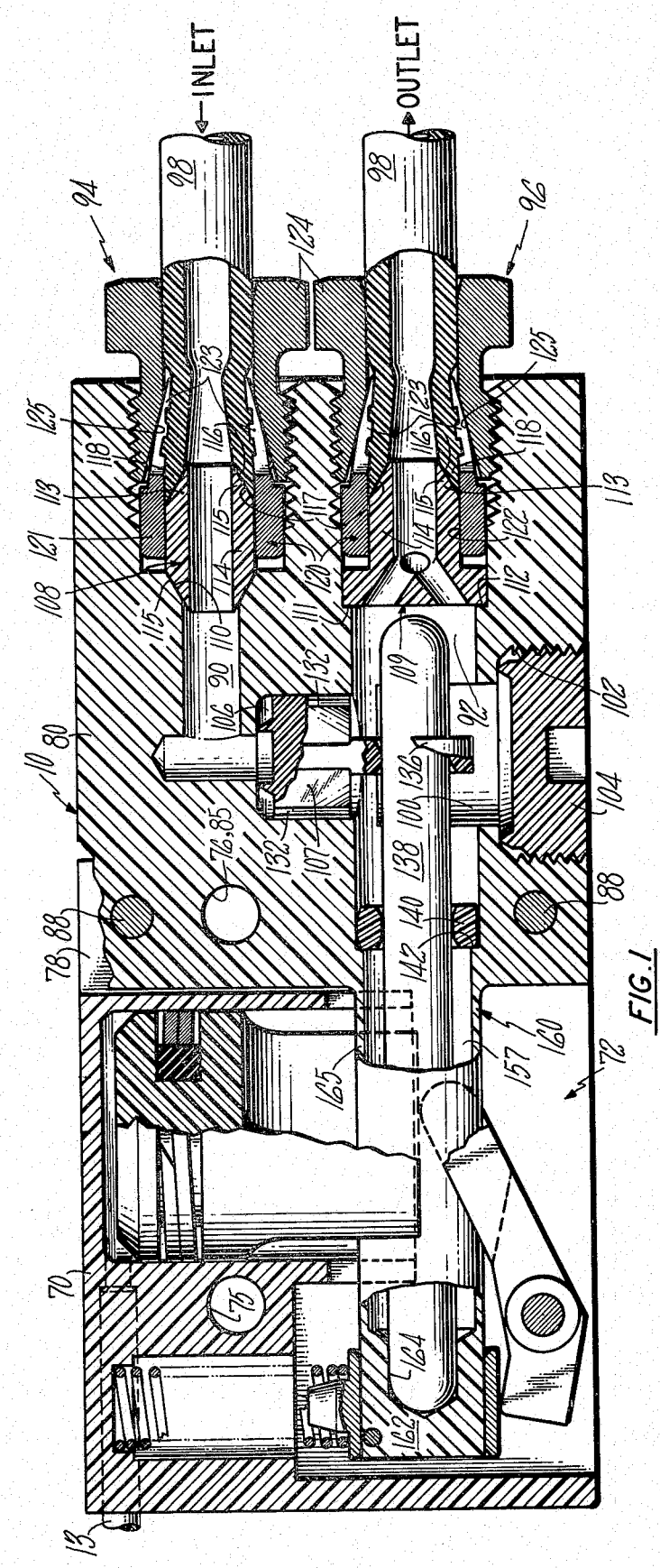
FIG. 1 is a longitudinal section view, partly broken away and partly in section, of a valve and valve tubing assembly employing plastic tubing connectors incorporating the present invention.

Referring now to the drawing in detail wherein like numerals designate like parts, and referring in particular to FIG. 1, a valve and valve tubing assembly employing plastic tubing connectors 94, 96 incorporating the present invention has an input conduit 13 adapted to be selectively connected to a suitable air pressure source for selective operation of the valve 10 of the assembly. The valve 10 shown is described in detail in my aforementioned copending patent application Ser. No. 485,789 and is therefore not disclosed and described in detail herein.

Briefly, however, the valve 10 has a two-piece elongated body structure with a first housing part 70 (preferably molded of a suitable relatively hard plastic) for a valve operating mechanism 72, and a second chemically inert relatively soft valve body part 80 preferably molded of Teflon (i.e., polytetrafluoroethylene). The housing part 70 has a generally box-like external configuration with opposed parallel faces permitting the valves 10 to be stacked together. For that purpose, the housing part 70 is formed with a pair of openings 75, 76 (and the valve body part 80 is formed with an opening 85 aligned with the opening 76) for securing a stack of the valves 10 together and/or to a suitable support with suitable fasteners extending through the openings 75, 76, 85. The housing part 70 has an inner bifurcated end with parallel flanges 78 for receiving the inner end of the valve body part 80, and the two parts 70, 80 are rigidly secured together by suitable fasteners such as rivets 88 extending through aligned openings in the spaced flanges 78 and valve body part 80.

The valve body part 80 is formed with a pair of laterally spaced longitudinally extending internal passageways 90, 92 with enlarged threaded outer openings for connecting the passageways with the connectors 94, 96 respectively to suitable chemically inert relatively soft plastic conduits or tubing 98 preferably made of Teflon. A transversely extending passageway or bore 100 is formed in the valve body 80 for interconnecting the parallel passageways 90, 92. The passageway 100 has an enlarged threaded outer opening 102 for receiving a suitable molded plastic plug 104 and forms a valve chamber 106 intermediate the passageways 90, 92 for receiving a molded plastic valve member 107. The plug 104 and valve member 107 are formed of a suitable chemically inert and hard plastic material.

The valve member 107 is molded with suitable axially extending peripheral slots 132 to provide a fluid connection between the parallel passageways 90, 92 when the valve member 107 is withdrawn from engagement with its valve seat. The valve member 107 is molded with an integral circular stem or collar 136 for receiving an enlarged generally cylindrical valve operating lever or rod 138 mounted within the passageway 92. A lever pivot ring 140 similar to the collar 136 is press fit within the passageway 92 in engagement with a locating shoulder 142 to provide a circular pivot or fulcrum for the lever 138. The pivot ring 140 is formed of a suitable hard and chemically inert plastic (as is the collar 136 which is formed integrally with the valve member 107). The elongated rod 138 is formed of a suitable rigid and chemically inert material, preferably a suitable ceramic material.

The rod 138 extends inwardly into a tubular opening or chamber 157 of the housing part 70 extending beyond the main generally box-like portion of the valve body part 80, and the valve body part 80 is formed with an imperforate elongated tubular extension 160 for completely enclosing the rod extension. The tubular extension 160 has a relatively thin flexible tubular wall 165 and a relatively thick end wall 162 formed with a pocket 164 for snugly receiving the adjacent end of the rod 138 and is integrally molded with the rest of the valve body part 80 whereby the tubular extension 160 and rod 138 can be pivoted together to shift the valve member 107 between its open and closed positions.

The connectors 94, 96 respectively comprise a male ferrule insert 108 and a male adapter insert 109 which are mounted in the passageways 90, 92 in sealing engagement respectively with a conforming tapered seat 110 and a conforming annular locating shoulder or seat 112 of the valve body part 80. The inserts 108, 109 are also molded of a suitable chemically inert and hard plastic material. Since the valve body part 80 is molded of relatively soft plastic (preferably a fluorocarbon polymer commonly sold under the trademark Teflon), the relatively hard plastic inserts 108 and 109 are adapted to coact therewith to provide an effective leakproof seal.

The ferrule insert 108 and adapter insert 109 provide axially outwardly projecting male connectors 113, each having a central cylindrical body portion 114 and an axially tapered end portion 115 forming a coaxial external or male conical sealing surface 116. The conical sealing surface 116 of each male connector 113 engages a conforming coaxial internal or female conical sealing surface 117 of an internally machined or chamfered tapered end or lip 118 of the tubing 98 to provide a good seal between the relatively hard plastic insert 108, 109 and the relatively soft Teflon tubing 98. The sealing lip 118 at the end of the tubular wall of the tubing is preferably machined or chamfered to provide an annular pointed edge as shown in the drawing and whereby the male connector 113 and tubing 98 have maximum sealing engagement.

The inner axial end of the ferrule insert 108 is similarly formed with an axially tapered end portion 115 for engaging the conforming internal or female conical sealing surface or seat 110 of the valve body part 80 to provide a good seal between the relatively hard plastic ferrule insert 108 and the relatively soft Teflon valve body part 80. The adapter insert 109 has a flat annular inner face 111 in engagement with the conforming relatively soft flat annular face or seat 112 of the valve body part 80 to provide a fluid-tight seal therebetween.

A collet sleeve 120 (of stainless steel for example) having an inner annular collar 121 with an internal cylindrical surface 122 and four outer axially extending equiangularly spaced gripping segments or fingers 123 is mounted over the tubing 98 and male connector 113 of each insert 108, 109. As shown in the drawing, the outer cylindrical surfaces of the plastic tubing 98 and male connectors 113 have substantially the same diameter, and the diameter of the inside cylindrical surface of the annular collar 121 is substantially equal to the outside diameter of the tubing 98 and male connector 113 (but preferably very slightly greater than the outside diameter of the tubing 98 and connector 113 to facilitate manually inserting the collar 121 onto the tubing 98 and male connector 113). The collar 121 is positioned to surround a portion of the cylindrical body portion 114 and the internally tapered end 118 of the tubing 98. Accordingly, the internally tapered end of the tubing is held by the annular collar 121 against outward radial expansion by the male connector 113, and the collar 121 and male connector 113 together form an axially extending wedge-shaped annulus for receiving the pointed lip 118 of the tubing 98 and which is closed at its inner end to prevent axial elongation of the lip 118.

A suitable gland nut 124 (of stainless steel for example) encircling the collet sleeve 120 and tubing 98 and having a relatively steep inwardly tapered internal conical camming surface 125 (e.g., at an angle of 30° to the axis of the nut 124) is threaded into the valve body 80 to lock the connector parts in place and provide a leakproof seal using the relatively hard plastic inserts 108, 109 as an intermediate sealing part between the relatively soft plastic body part 80 and the tubing 98. The gripping fingers 123 are thereby cammed or swaged radially inwardly as shown to permanently attach the collet sleeve 120 to the tubing 98. The inner surfaces of the fingers 123 are formed with transverse grooves to firmly grip the tubing 98 and thereby lock the collet sleeve 120 in place on the tubing 98. Alternatively, the collet sleeve 120 can be permanently swaged onto the end of the tubing 98 as shown in FIG. 1 by a suitable swaging tool which swages the fingers 123 inwardly in the manner of the gland nut 124.

The connectors 94, 96, when assembled as shown, provide chemically inert transitional passageways from the tubing 98 to the internal valve body passageways 90, 92. The valve 10 may be used with substantially any fluid as desired, it being seen that the connector seals are provided by the coaction of a relatively hard plastic male conical sealing surface with a relatively soft female conical sealing surface of the Teflon tubing 98. Also, the single piece molded Teflon valve body part 80 provides a female conical seat 110 and an annular sealing surface 112 for the hard plastic inserts 108, 109 respectively. Therefore, the connector material and design collectively produce an effective connector for handling chemically active fluids. The connector design also permits miniaturization and using soft plastic tubing having a standard outside diameter of, for example, ⅛ inch and an inside diameter selected for each particular application as desired, it being seen that the plastic tubing connector is designed for a particular tubing outside diameter and can be used with any selected tubing inside diameter.

Figure 2:
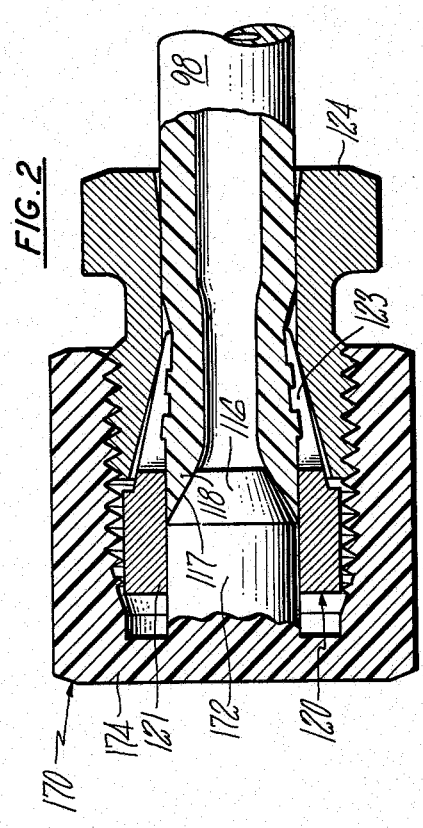
FIG. 2 is a longitudinal section view, partly broken away and partly in section, of a plug and tubing assembly incorporating the present invention.

The connectors described with reference to the valve 10 of FIG. 1 can be employed for connecting a soft plastic tubing to a non-valve body structure if desired, and, for example, if the non-valve body structure can be made of the same relatively hard plastic as the insert 108, 109, the insert can be integrally molded with the body structure. For example, a plug-type tubing connector 170 having a male connector 172 integrally molded with an internally threaded cap 174 is shown in FIG. 2. The threaded cap 174 provides for securing the plug connector 170 and tubing 98 together with the gland nut 124 in the manner of the connectors 94, 96 shown in FIG. 1. The entire plug connector 170 is formed of a relatively hard plastic suitable for providing a good fluid-type seal between its external or male conical sealing surface 116 and the conforming internal or female conical sealing surface 117 of the Teflon tubing 98.

It has been found that the connector design described provides a good fluid-type seal and a structurally durable connector with relatively slippery, soft and pliable, small diameter plastic tubing of Teflon or the like plastic even though such tubing material can be relatively easily deformed and is subject to cold flow and can be relatively easily overstressed and deformed. The connector provides effective sealing action through the engagement of an internal or female conical sealing surface on the end of the tubing with a conforming external or male sealing surface on the male connector and through compressing the internally tapered lip 118 of the tubing 98 between the conical sealing surface 116 of the male connector and the internal cylindrical surface of the collet collar 121.

The sealing action is therefore accomplished by compressing and wedging the annular internally tapered lip 118 at the end of the tubing within a conforming wedge-shaped annulus formed between the tapered end of the connector and the internal cylindrical surface of the collar 121. The connector design is both economical and easy to use and the internal conical sealing surface may be readily formed within the end of any size plastic tubing of Teflon or the like plastic, and having any selected internal diameter as desired, by machining an internal conical seat in the end of the soft tubing with a suitable cutting tool.

As will be apparent to persons skilled in the art, various modifications, adaptations and variations of the foregoing specific disclosure can be made without departing from the teachings of the present invention.

I claim:

1. In a soft plastic tubing and connector structure assembly, the improvement wherein the connector structure comprises an axially extending male connector with a coaxial axially outwardly tapered conical male sealing surface at an outer end thereof, wherein the soft plastic tubing has an end with a coaxial conical female sealing surface forming an annular axially outwardly internally tapered lip at the end of the tubing, the conical male sealing surface being harder than the plastic tubing and the male connector and tubing having outer cylindrical surfaces of substantially the same diameter, and wherein the connector structure further comprises retaining means for holding the plastic tubing and male connector in axial alignment with the respective female and male conical sealing surfaces in sealing engagement and for holding the outer cylindrical surface of said lip at the end of the tubing against radial expansion beyond substantially the same diameter as that of the male connector, the retaining means comprising a tubing retaining collar having a generally cylindrical bore closely surrounding the male connector and the internally tapered lip of the plastic tubing and defining with the conical male sealing surface a fixed generally wedge shaped annulus for receiving and retaining the annular internally tapered lip of the plastic tubing against substantial outward radial expansion and means for axially urging the internally tapered lip into the generally wedge shaped annulus for urging the conical female and male sealing surfaces of the tubing and male connector into sealing engagement comprising axially outwardly extending gripping fingers in gripping engagement with the plastic tubing and intergrally formed with the collar to provide a collet for urging the plastic tubing into the generally wedge shaped annulus for sealing engagement with the male connector.

2. The plastic tubing and connector structure assembly of claim 1 wherein the urging means further comprises a body with a threaded section coaxial with the male connector and an outer gland nut surrounding the collet and engageable therewith and threaded onto the threaded section of the body for urging the plastic tubing into the generally wedge shaped annulus for sealing engagement with the male connector.

3. The plastic tubing and connector structure assembly of claim 2 wherein said threaded body section is an internally threaded bore section receiving the male connector.

4. In a soft plastic tubing and connector structure assembly for soft plastic tubing having a tubular wall of generally uniform composition, the improvement wherein the connector structure comprises an axially extending male connector with a coaxial axially outwardly tapered conical male sealing surface at an outer end thereof, wherein the soft plastic tubing has a tubular wall of generally uniform composition with an internally chamfered axial end forming a coaxial conical female sealing surface which defines an annular axially outwardly internally tapered lip at the end of the soft plastic tubing, the conical male sealing surface being harder than the plastic tubing and the male connector and internally tapered lip of the tubing having outer cylindrical surfaces of substantially the same diameter, and wherein the connector structure further comprises retaining means for holding the plastic tubing and male connector in axial alignment with the respective female and male conical sealing surfaces in sealing engagement and for holding the outer cylindrical surface of said internally tapered lip at the end of the tubing against axial elongation and radial expansion beyond substantially the same diameter as that of the male connector, the retaining means comprising a tubing retaining collar having a generally cylindrical bore closely surrounding the male connector and the internally tapered lip of the plastic tubing and defining with the conical male sealing surface an acute angle with the vertex thereof defined by said cylindrical bore of said collar and said male connector which forms a fixed generally wedge shaped annulus closed at the inner axial end thereof for receiving and retaining the annular internally tapered lip of the plastic tubing against substantial outward radial expansion and axial elongation and means including tube gripping means for axially urging the internally tapered lip into the generally wedge shaped annulus for urging the conical female and male sealing surfaces of the tubing and male connector into sealing engagement.

5. The plastic tubing and connector structure assembly of claim 4 wherein the tubing is made of a fluorocarbon polymer.

6. The plastic tubing and connector structure assembly of claim 4 wherein the tubing is made of a soft plastic subject to cold flow.

7. The plastic tubing and connector structure assembly of claim 4 wherein the male connector and plastic tubing are made of a chemically inert plastic material.

* * * * *